(12) United States Patent
Beierl et al.

(10) Patent No.: US 7,798,554 B2
(45) Date of Patent: Sep. 21, 2010

(54) MOTOR VEHICLE ROOF CONFIGURATION WHICH CAN BE PUT AWAY

(75) Inventors: Dominik Beierl, Korntal-Münchingen (DE); Felix Hermann, Leonberg (DE); Harald Neidlein, Stuttgart (DE); Angelo Bronda, Weissach (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 138 days.

(21) Appl. No.: 12/206,044

(22) Filed: Sep. 8, 2008

(65) Prior Publication Data

US 2009/0066110 A1 Mar. 12, 2009

(30) Foreign Application Priority Data

Sep. 10, 2007 (DE) .................. 10 2007 042 831

(51) Int. Cl.
*B60J 7/00* (2006.01)
(52) U.S. Cl. .............................. 296/107.01; 296/107.04
(58) Field of Classification Search ............ 296/107.01, 296/107.04, 135, 154; 49/475.1, 476.1, 495.1
See application file for complete search history.

(56) References Cited

U.S. PATENT DOCUMENTS

| | | | |
|---|---|---|---|
| 2,798,763 A | | 7/1957 | Dujic |
| 4,529,243 A | * | 7/1985 | Kaltz et al. ............ 296/107.04 |
| 4,729,593 A | * | 3/1988 | Nisiguchi et al. ...... 296/107.04 |
| 5,669,656 A | | 9/1997 | Aydt et al. |
| 6,189,950 B1 | * | 2/2001 | Kawazoe et al. ....... 296/107.04 |
| 6,270,145 B1 | * | 8/2001 | Kamo et al. ........... 296/107.04 |
| 6,382,702 B1 | | 5/2002 | Kasparak et al. |
| 6,857,684 B2 | * | 2/2005 | Worley ................. 296/107.04 |
| 2002/0167201 A1 | | 11/2002 | Niebuhr et al. |
| 2004/0032145 A1 | * | 2/2004 | Worley ................. 296/107.04 |
| 2006/0186693 A1 | * | 8/2006 | Taira et al. ............ 296/107.04 |

FOREIGN PATENT DOCUMENTS

| | | |
|---|---|---|
| DE | 4039444 A1 | 6/1992 |
| DE | 4441671 C1 | 11/1995 |
| DE | 19720391 A1 | 11/1998 |
| DE | 19957049 A1 | 6/2001 |
| DE | 10040919 A1 | 3/2002 |

(Continued)

OTHER PUBLICATIONS

German Search Report dated Apr. 9, 2010.

(Continued)

*Primary Examiner*—Lori L Lyjak

(57) ABSTRACT

A motor vehicle roof configuration which can be put away has at least two shaping sections, which are movable relative to one another and can be put away together, for lateral convertible top cloth strips. The shaping sections lie in a row next to one another in a closed position of the roof configuration and have water channels which run approximately parallel to each convertible top cloth strip and in the longitudinal direction of the vehicle and also adjacent to the convertible top cloth strips. It is provided that, at least in a closed position of the roof configuration, an inner edge of each convertible top cloth strip together with at least one sealing configuration forms a leakproof covering for the adjacent water channel.

17 Claims, 5 Drawing Sheets

FOREIGN PATENT DOCUMENTS

| | | |
|---|---|---|
| DE | 10320538 A1 | 12/2004 |
| DE | 102005000943 A1 | 7/2006 |
| DE | 10 2005 027 511 A1 | 12/2006 |
| DE | 102006016854 B3 | 7/2007 |
| EP | 1247672 A2 | 10/2002 |
| EP | 1792764 A2 | 6/2007 |

OTHER PUBLICATIONS

European Search Report dated Apr. 19, 2010.

* cited by examiner

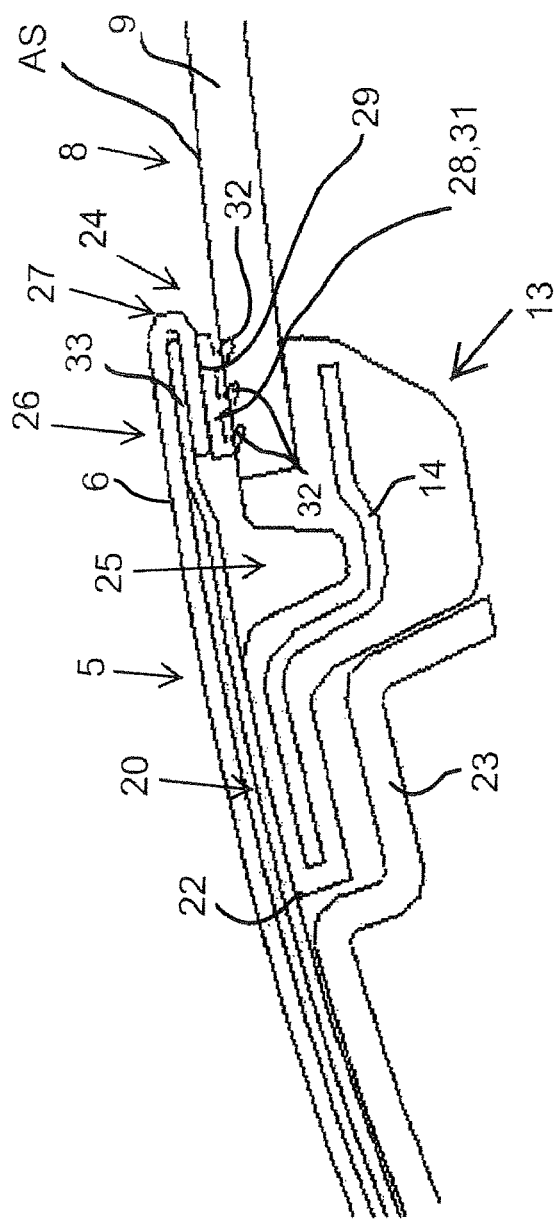
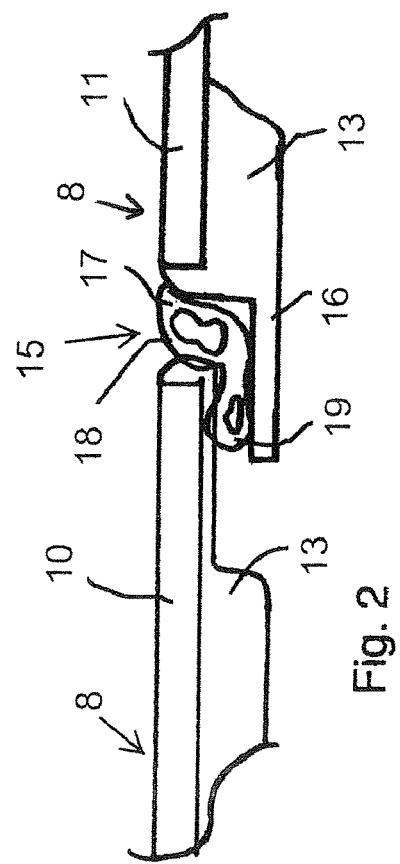
Fig. 3
Fig. 2

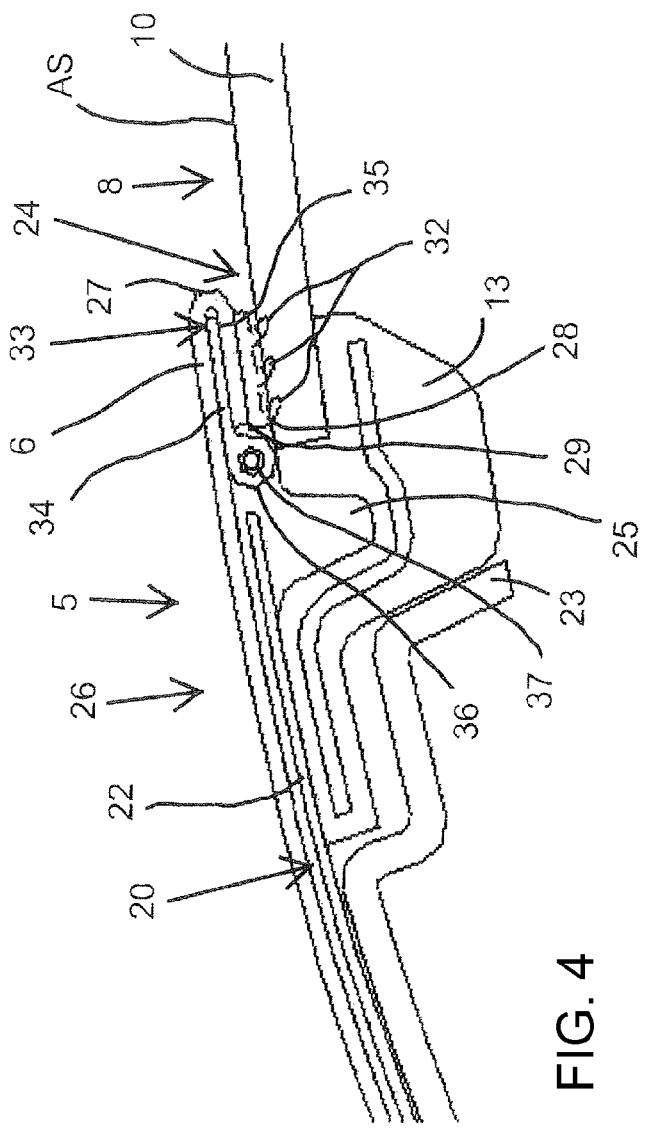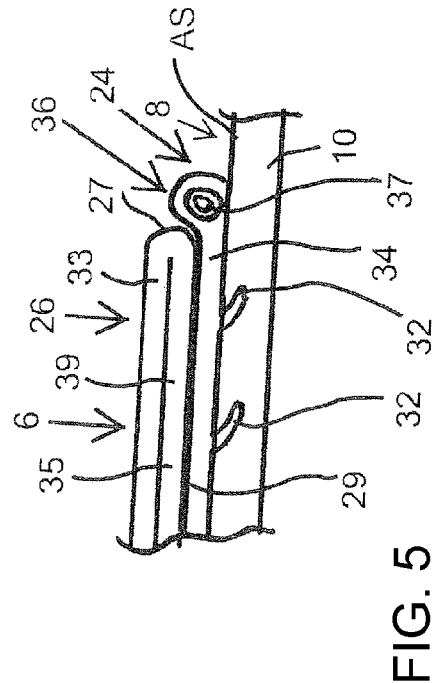
FIG. 4
FIG. 5

MOTOR VEHICLE ROOF CONFIGURATION WHICH CAN BE PUT AWAY

CROSS-REFERENCE TO RELATED APPLICATION

This application claims the priority, under 35 U.S.C. §119, of German application DE 10 2007 042 831.8, filed Sep. 10, 2007; the prior application is herewith incorporated by reference in its entirety.

BACKGROUND OF THE INVENTION

FIELD OF THE INVENTION

The invention is based on a motor vehicle roof configuration which can be put away.

A motor vehicle roof configuration which can be put away and which forms the generic type is known from published, non-prosecuted German patent application DE 10 2005 027 511 A1. It contains at least two roof parts which are movable relative to one another and can be put away, and which laterally form shaping sections for a convertible top cloth strip, which is fitted laterally in each case, and which lie next to one another in a row or adjacent to one another in the closed position of the roof configuration. The roof parts have glass inserts between the convertible top cloth strips. Water channels which are formed in the frames of the roof parts run approximately parallel to each convertible top cover strip and in the longitudinal direction of the vehicle and also adjacent to the convertible top cloth strips. By use of flexible rods or cables which run in pockets on the convertible top cloth strip, the convertible top cloth strips are pulled onto the shaping sections at least in the region of slack in the material. In this case, an inner edge of the convertible top cloth strip comes to lie in the water channel. The convertible top cloth strips can also be connected in sections to the shaping sections.

SUMMARY OF THE INVENTION

It is accordingly an object of the invention to provide a motor vehicle roof configuration which can be put away that overcomes the above-mentioned disadvantages of the prior art devices of this general type, which has optimized water management.

With the foregoing and other objects in view there is provided, in accordance with the invention, a roof configuration for a motor vehicle which can be put away. The roof configuration contains lateral convertible top cloth strips each having an inner edge and at least two shaping sections being movable relative to one another and can be put away together, for the lateral convertible top cloth strips. The shaping sections lie in a row next to one another in a closed position of the roof configuration and have water channels running approximately parallel to each of the lateral convertible top cloth strips and in a longitudinal direction of the motor vehicle and also adjacent to the lateral convertible top cloth strips. At least one sealing configuration is provided. At least in a closed position of the roof configuration, the inner edge of each of the lateral convertible top cloth strips together with the at least one sealing configuration form a leakproof covering for adjacent ones of the water channels.

The advantages primarily obtained with the invention are that the quantity of water entering the water channel is significantly reduced and, in the most favorable case, entry of water into the channel can even be avoided. This is already advantageous because the water channel between two shaping sections can be interrupted. The quantity of water to be conducted away from the water channels is therefore relatively small and the water does not back up.

An advantageous waterproof covering can be achieved in particular if the edge of the convertible top cloth strip extends beyond the water channel and, for example, comes to lie on a central section which extends between the two lateral convertible top cloth strips. Accordingly, the central section can be configured to be transparent or painted in color, in particular in the color of the vehicle body, or textured.

An improved sealing configuration is supported by a reinforcement, and the edge of the convertible top cloth strip obtains a visually high-quality finish which can be formed by a weatherstrip.

By use of a tensioning cable, a contact pressure can be built up on the sealing configuration. In addition, a tensioning cable improves the positioning of the sealing configuration on the shaping section.

In accordance with an added feature of the invention, the sealing configuration rests on an outer side of the shaping section when the roof configuration is in the closed position.

In accordance with a further feature of the invention, each of the water channels has a wall and the sealing configuration interacts with the wall of the water channels.

An exemplary embodiment particularly preferred has a second sealing configuration which prevents water from penetrating the vehicle interior and holds back the water in the water channel.

A further preferred exemplary embodiment has the advantage that water can be trapped at a transition between two sections of water channels on two consecutively arranged shaping sections. However, the water-trapping device may also be provided continuously. The water-trapping device which can be configured as a shell or channel is preferably fastened to a frame or the shaping section.

Other features which are considered as characteristic for the invention are set forth in the appended claims.

Although the invention is illustrated and described herein as embodied in a motor vehicle roof configuration which can be put away, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a diagrammatic, longitudinal section view of ther roof configuration taken along the line II-II shown in FIG. 1;

FIG. 3 is a diagrammatic, cross-sectional view, running in a transverse direction of the vehicle, taken along the line III-III shown in FIG. 1 through a convertible top cloth strip with a sealing configuration; and FIGS. 4 to 7 are diagrammatic, sectional views of further exemplary embodiments of convertible top cloth strips and sealing configurations.

DETAILED DESCRIPTION OF THE INVENTION

Figure 1:
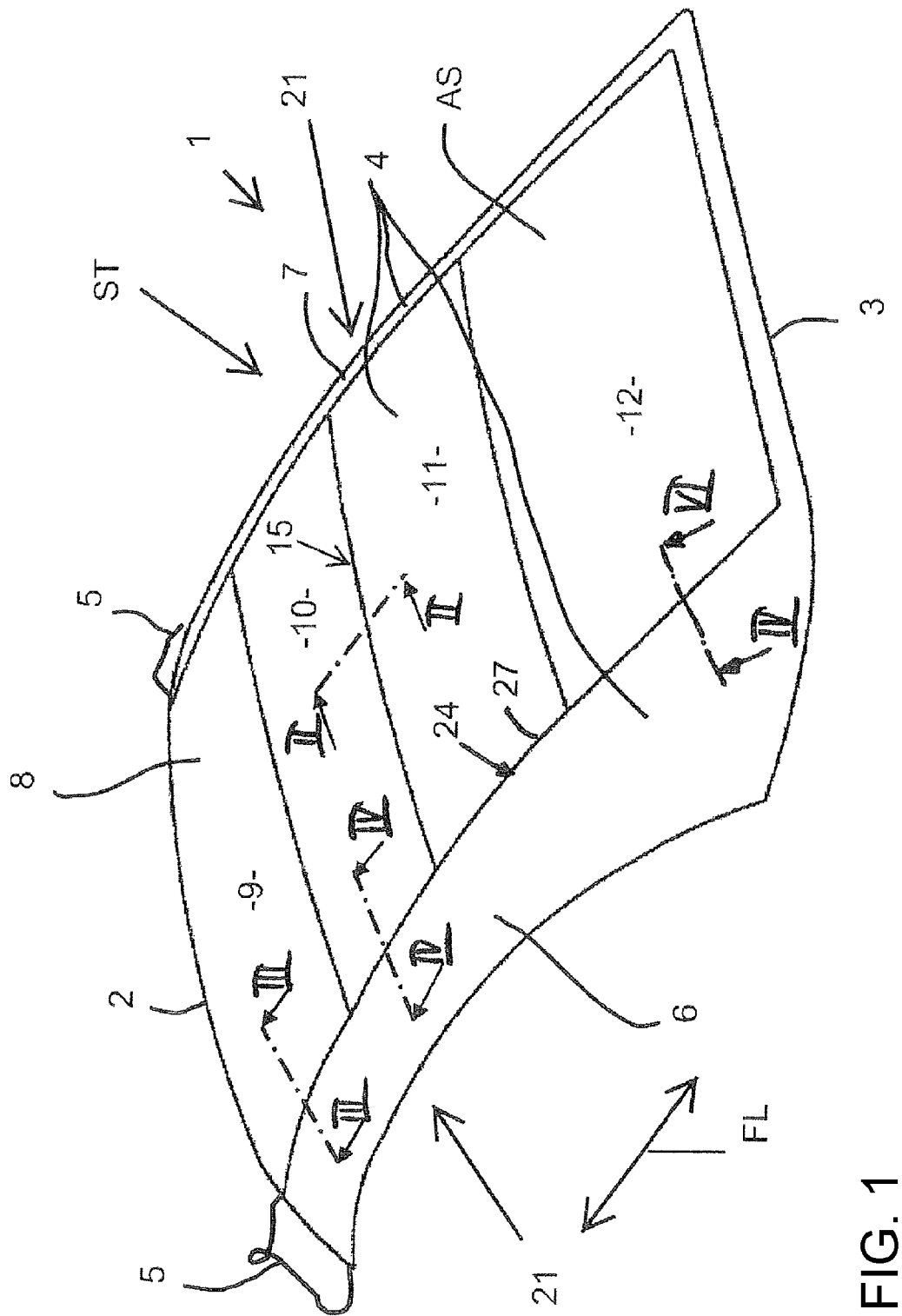
FIG. 1 is a diagrammatic, perspective view of a roof configuration which can be put away according to the invention.

Referring now to the figures of the drawing in detail and first, particularly, to FIG. 1 thereof, there is shown a roof configuration 1 which can be put away and is intended for a non-illustrated motor vehicle, in particular a convertible, and which has a front end 2 and a rear end 3 that can be seen in a perspective view from the rear. The front end 2 interacts with a non-illustrated motor vehicle windshield frame part when the roof configuration 1 is in its closed position ST shown and spans a vehicle interior or passenger compartment FG. The rear end 3 ends in a rear region of the motor vehicle. A non-illustrated storage box which receives the folded-up roof configuration 1 in a put-away position is furthermore provided in the rear region. The storage box can be provided with a fixed or movable box lid.

From the end 2 to the end 3, the roof configuration 1 has a roof skin 4 which is composed as follows: a lateral convertible top cloth strip 6 and 7 composed of a flexible, water-impermeable material, as known for convertible top materials of "soft tops", is located in each case laterally in an edge strip section 5 of the roof skin 4. A central section 8 which is preferably composed of a stiff material and is produced to be transparent and/or painted in color and/or textured lies in-between. Below the roof skin 4 there are at least two, here four roof segments 9, 10, 11 and 12 which, in the closed position ST, lie next to one another in a row and, in the put-away position, are shifted in a preferred sequence 9, 10, 11 and 12 (as seen from the top to the bottom) into the storage box.

At least one, preferably all, or at least two or three of the roof segments 9, 10 and 11 are constructed as follows. As, for example, FIGS. 2 and 3 show, they have the central section 8, for example in the form of a glass insert, which is fastened to a frame 13 located therebelow. The frame 13 can be configured in an encircling manner as a foam-encapsulated structure of the central section 8 and can have a reinforcing insert 14, for example made of sheet metal. In a transverse sealing gap 15 between two mutually adjacent roof segments 10 and 11 (FIG. 2), the frame 13 serves, by use of an extension 16, as a seal carrier for a seal 17 with two sealing strands 18 and 19 in the transverse sealing gap 15. In this case, the extension 16 extends to below the adjacent roof segment 10. In addition, each frame 13, at least in sections below the edge strip section 5, forms a shaping section 20 for the convertible top cloth strip 6 or 7, which shaping section lies parallel to the associated convertible top cloth strip 6, 7 and on which the respective convertible top cloth strip 6 or 7 rests, if appropriate with the intermediate configuration of an insulating layer. The shaping sections 20 of the roof segments 9, 10, 11 and 12, which shaping sections 20 lie next to one another in a row and run in strips approximately in a longitudinal direction FL of the vehicle, thus form the contours of a lateral roof frame 21 into which non-illustrated side windows of the convertible can retract. The shaping sections 20 can be supported or enlarged in surface area by stiff material strips 22. Furthermore, the shaping sections 20 can be formed by lateral supports 23 on which, first, a convertible top kinematics (not shown here) for moving the roof configuration 1 and, second, the frame 13 can be held. The material strips 22 can extend over the support 23 and the frame 13. The seal 17 can extend into the region of the frame 13 and/or of the shaping sections 20.

As can also be seen in FIG. 3, a water channel 25 which is upwardly open in cross section and emerges, preferably as a single piece, from the frame 13 or the shaping section 20 thereof lies below a longitudinal sealing gap 24, which runs in the longitudinal direction FL of the vehicle (FIG. 1), preferably on one, two, three or on each roof segment 9, 10, 11 and 12. The upwardly open water channel 25 is covered in a waterproof manner by a covering 26. The covering 26 is formed by an inner edge 27 of the convertible top cloth strip 6 or 7, i.e. the edge which lies adjacent on the inside to the central section 8 and not on the outside to the roof frame 21, and by a sealing configuration 28 which emerges from a lower side 29 of the convertible top cloth strip 6 or 7. The sealing configuration 28 rests either on the outer side AS of the central section 8 (FIGS. 3 to 6) or bears against a side wall 30 (FIG. 7) of the water channel 25.

Differences between the individual figures are mainly entered into below. However, identical or identically acting parts are provided with the same reference numbers throughout.

In the first exemplary embodiment according to FIG. 3, the material strip 22 is pulled over the water channel 25 and the edge 27 of the convertible top cloth strip 6 is folded over on the end side around the material strip 22. The sealing configuration 28, which is configured as a sealing strip 31 running in the longitudinal direction FL of the vehicle, has one or more sealing lips 32 which can run parallel to and at a lateral distance from one another and, in the closed position ST, rest on the central section 8. This exemplary embodiment is preferably used in the regions, for example in sections of the roof segment 9, in which the convertible top cloth strip 6 or 7 is not raised from the shaping sections 20 for the put-away position of the roof configuration 1. That is to say, the material strip 22 can be connected fixedly to the support 23 or the frame 13. The sealing configuration 28 is fastened to the convertible top cloth strip 6 or 7 at the folded-over section of the edge 27. In other sections of the convertible top cloth strip 6 or 7 there may be material slack in order to be able to put away the roof configuration 1.

In the second exemplary embodiment according to FIG. 4, the material strip 22 is shortened and ends above the water channel 25. The edge 27 is folded over around a separate, strip-like reinforcement 33 which is configured as a weatherstrip 34. The weatherstrip 34 has a strip section 35 around which the edge 27 is placed. The weatherstrip 34 also has, exposed on the inside, a bead-like receiving section 36 for a tensioning cable 37 which runs in the longitudinal direction FL of the vehicle. As in the exemplary embodiment according to FIG. 3, the sealing configuration 28 lies on the folded-over section of the edge 27, which section therefore forms the lower side 29.

In the third exemplary embodiment according to FIG. 5, the weatherstrip 34 is not accommodated here between the folded-over layers 38 and 39 of the edge 27 but rather is fastened to the lower side 29 of the folded-over section of the edge 27. The bead-like receptacle 36 for the tensioning cable 37 is likewise exposed, but on the outside in the sealing gap 24.

Figure 6:
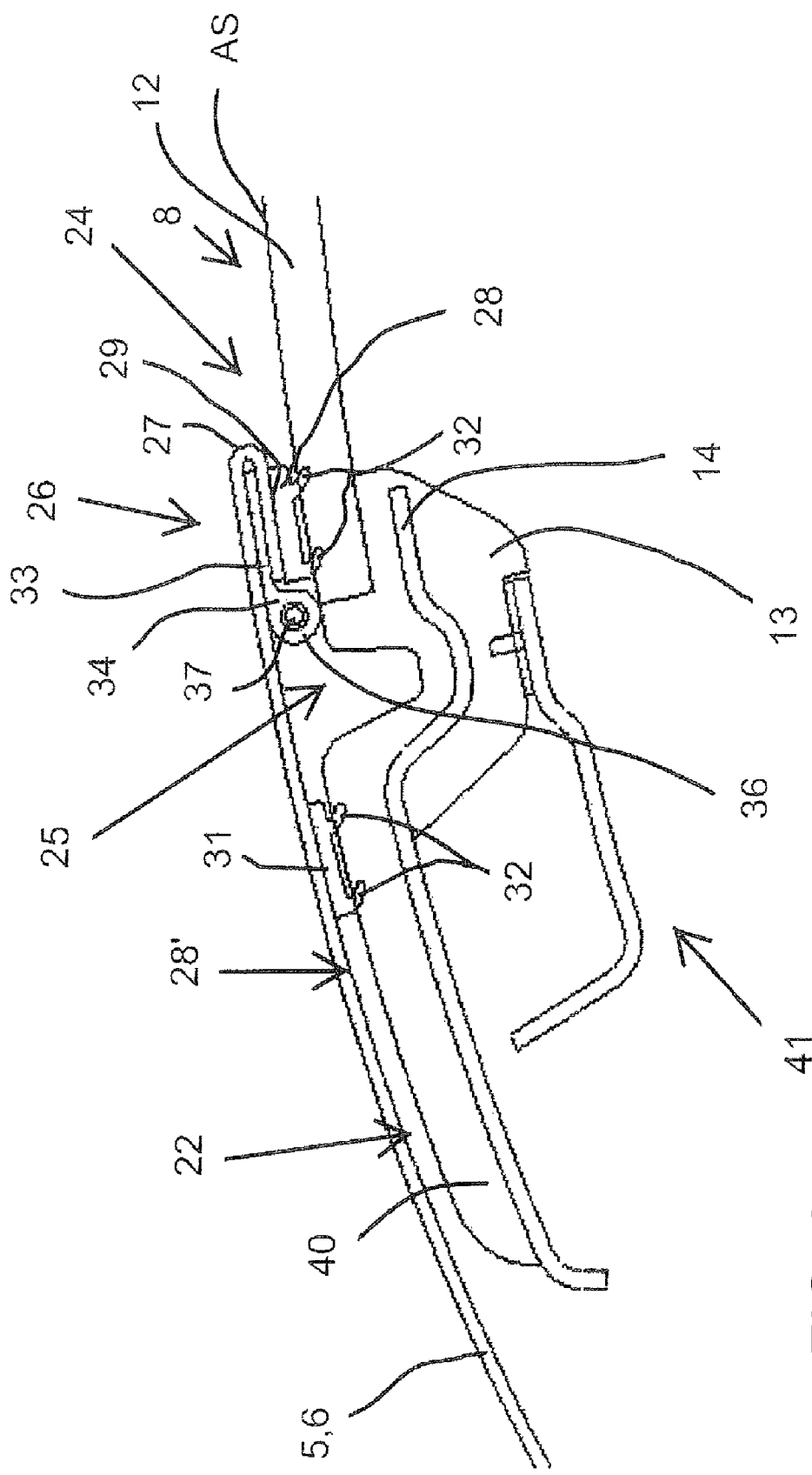
Figure 7:
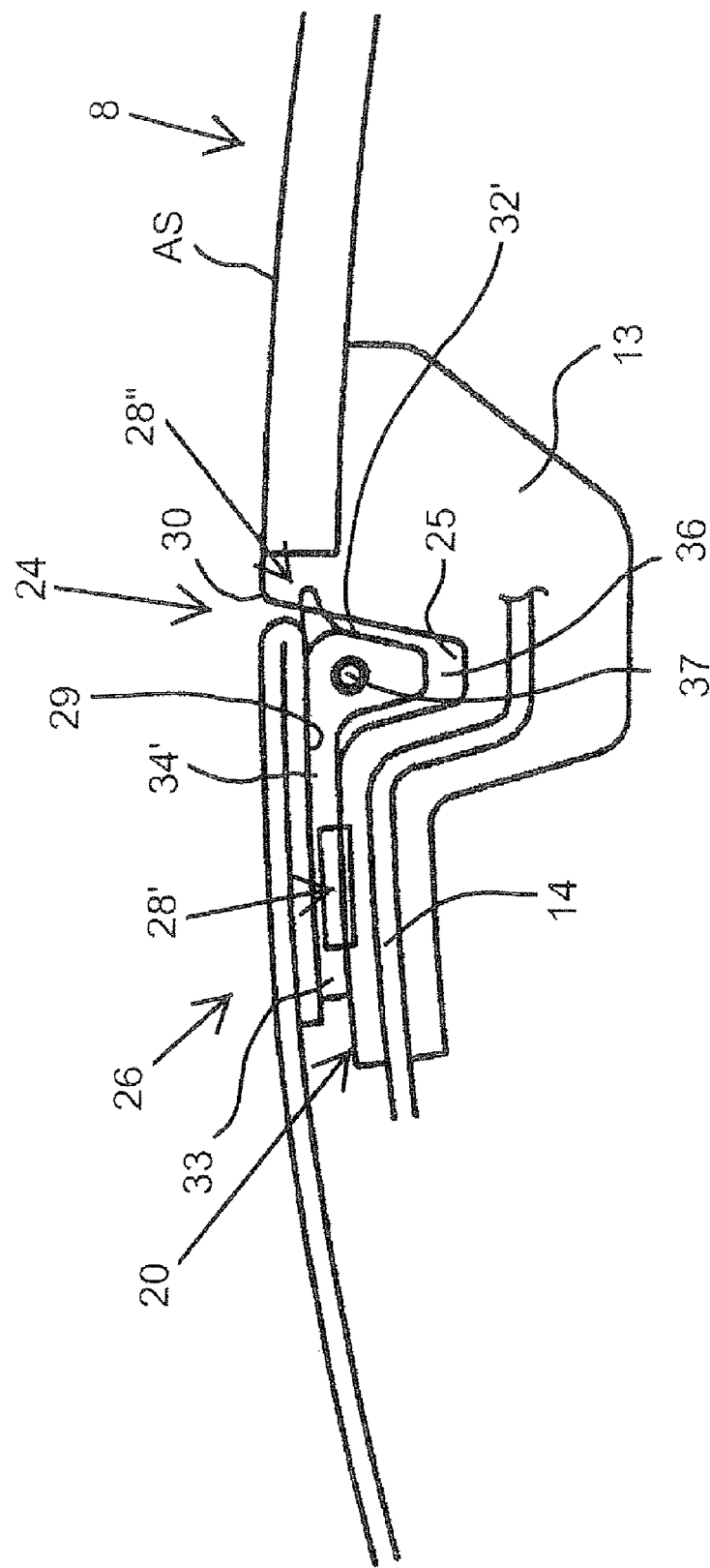

In the fourth exemplary embodiment according to FIG. 6, the covering 26 for the water channel 25 is configured substantially identically to the covering 26 in FIG. 4. However, the frame 13 here takes over the task of the material strip 22 by a lateral widened portion 40, with lateral widened portions 40 each extending parallel to the central section 8 of the roof segment 12 which can form a rear roof element with a rear window. The reinforcing insert 14 extends into the widened portions 40. The covering 26 for the water channel 25 has here, on both sides, a sealing configuration 28, 28' extending along the water channel 25. In principle, it would be conceivable to configure both sealing configurations 28, 28' identically, as shown for the sealing strip 31 with the two sealing lips 32. However, the sealing configurations 28, 28' may have a different number of sealing lips 32. Furthermore, it would be conceivable to assign a sealing configuration 28'' to the sealing configuration 28', as shown in FIG. 7. In addition, a water-trapping device 41 which can be configured as an upwardly open shell or channel is also attached to the frame 13. It can extend along the roof frame 21 in the longitudinal direction FL of the vehicle, in particular in sections below the transverse sealing gaps 15 or continuously below the water channel 25. The water-trapping device 41 is preferably configured as a separate, flexible component and is fastened to the frame 13.

In the fifth exemplary embodiment according to FIG. 7, the convertible top cover strip 6 or 7 is aligned here approximately with the outer side AS, thus forming a planar roof outer skin 4. That is to say, the edge 27 reaches as far as the outer side wall 30 which merges into the outer side AS, and, on the lower side 29, the edge 27 bears a weatherstrip 34' with the receptacle 36 for the tensioning cable 37, the wedge-shaped receptacle 36 lying within the water channel 25 and the strip section 35 of the weatherstrip 34' being placed between the lower side 29 and the shaping section 20. A sealing lip 32' which is positioned in a sealing manner against the side wall 30 emerges from the receptacle 36. However, the water channel 25 is largely shielded. A second sealing configuration 28', as described for the exemplary embodiment according to FIG. 6, can also be provided between the strip section 35 and the shaping section 20.

The invention claimed is:

1. A roof configuration for a motor vehicle which can be put away, the roof configuration comprising:
    lateral convertible top cloth strips each having an inner edge;
    at least two shaping sections being movable relative to one another and can be put away together, for said lateral convertible top cloth strips, said shaping sections lie in a row next to one another in a closed position of the roof configuration and have water channels running approximately parallel to each of said lateral convertible top cloth strips and in a longitudinal direction of the motor vehicle and also adjacent to said lateral convertible top cloth strips; and
    at least one sealing configuration, at least in a closed position of the roof configuration, said inner edge of each of said lateral convertible top cloth strips together with said at least one sealing configuration forming a leakproof covering for adjacent ones of said water channels.

2. The roof configuration according to claim 1, wherein said lateral convertible top cloth strips each have a lower side and reach beyond said water channels and have said sealing configuration on said lower side.

3. The roof configuration according to claim 1, wherein said sealing configuration has a plurality of sealing lips running parallel to one another.

4. The roof configuration according to claim 1, wherein said convertible top cloth strips each have an edge of a reinforced design.

5. The roof configuration according to claim 4, further comprising a weatherstrip for a reinforcement of said edge of said convertible top cloth strips.

6. The roof configuration according to claim 4, wherein said edge of said lateral convertible top cloth strips is of a two-layered design having two layers.

7. The roof configuration according to claim 6, further comprising a weatherstrip disposed between said two layers in said edge of said lateral convertible top cloth strips, and said sealing configuration is attached to a lower side of said lateral convertible top cloth strips.

8. The roof configuration according to claim 5, further comprising a tensioning cable accommodated in said weatherstrip.

9. The roof configuration according to claim 1, wherein said sealing configuration rests on an outer side of said shaping sections when the roof configuration is in the closed position.

10. The roof configuration according to claim 1, wherein each of said water channels has a wall and said sealing configuration interacts with said wall of said water channels.

11. The roof configuration according to claim 1, wherein said sealing configuration extends along each of said water channels on both sides.

12. The roof configuration according to claim 1, wherein said shaping sections each have a frame and said water channels are formed on said frame.

13. The roof configuration according to claim 1, wherein said shaping sections each have a frame and said water channels are formed on said frame, and said frame has a reinforcing insert.

14. The roof configuration according to claim 1, wherein said shaping sections each have a frame and said water channels are formed on said frame section, and said frame is formed by a foam-encapsulated structure.

15. The roof configuration according to claim 1,
    wherein said shaping sections each have a frame; and
    further comprising a central section being one of transparent, painted in color and is textured is disposed on said frame.

16. The roof configuration according to claim 15, further comprising a water-trapping device disposed at least in sections on an inner side of one of said shaping sections and said frame, and said inner side faces a vehicle interior.

17. The roof configuration according to claim 1, further comprising a seal disposed between said two shaping sections.

* * * * *